(12) United States Patent
Huang et al.

(10) Patent No.: US 11,194,171 B2
(45) Date of Patent: Dec. 7, 2021

(54) STRUCTURED LIGHT PROJECTION MODULE, DEPTH CAMERA, AND METHOD FOR MANUFACTURING STRUCTURED LIGHT PROJECTION MODULE

(71) Applicant: ORBBEC INC., Guangdong (CN)

(72) Inventors: Yuanhao Huang, Shenzhen (CN); Zhaomin Wang, Shenzhen (CN); Min Yan, Shenzhen (CN); Xing Xu, Shenzhen (CN); Xu Chen, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 0 days.

(21) Appl. No.: 16/867,457

(22) Filed: May 5, 2020

(65) Prior Publication Data
US 2020/0278562 A1 Sep. 3, 2020

Related U.S. Application Data

(63) Continuation of application No. PCT/CN2018/113780, filed on Nov. 2, 2018.

(30) Foreign Application Priority Data

Nov. 6, 2017 (CN) .......................... 201711080702.5

(51) Int. Cl.
*G02B 27/48* (2006.01)
*H04N 13/254* (2018.01)
(Continued)

(52) U.S. Cl.
CPC .............. *G02B 27/48* (2013.01); *G01C 3/08* (2013.01); *G02B 27/4233* (2013.01); *H04N 13/254* (2018.05)

(58) Field of Classification Search
CPC .................................................... G06T 7/521
See application file for complete search history.

(56) References Cited

U.S. PATENT DOCUMENTS

| 8,630,039 B2 | 1/2014 | Shpunt |
| 8,749,796 B2 | 6/2014 | Pesach et al. |

(Continued)

FOREIGN PATENT DOCUMENTS

| CN | 101984767 A | 3/2011 |
| CN | 103309137 A | 9/2013 |

(Continued)

OTHER PUBLICATIONS

PCT International Search Report and the Written Opinion dated Jan. 30, 2019, issued in related International Application No. PCT/CN2018/113778, with partial English translation (14 pages).

(Continued)

*Primary Examiner* — Clifford Hilaire
(74) *Attorney, Agent, or Firm* — Sheppard Mullin Richter & Hampton LLP

(57) ABSTRACT

A structured light projection module, a depth camera, and a method for manufacturing the structured light projection module are provided. The module comprises: a light source, comprising a plurality of sub-light sources that are arranged in a two-dimensional array and configured to emit two-dimensional patterned beams corresponding to the two-dimensional array, and the two-dimensional patterned beams comprising two-dimensional patterns; a lens, receiving and converging the two-dimensional patterned beams; and a diffractive optical element, receiving the two-dimensional patterned beams converged and emitted from the lens, and projecting speckle patterned beams corresponding to speckle patterns. The speckle patterns comprise a plurality of image patterns corresponding to the two-dimensional patterns. Relationships between adjacent image patterns of (Continued)

the plurality of image patterns comprise at least two of an overlapping relationship, an adjoining relationship, and a spacing relationship. The structured light projection module can project speckle patterns having a high degree of irrelevance.

18 Claims, 7 Drawing Sheets

(51) Int. Cl.
  *G01C 3/08* (2006.01)
  *G02B 27/42* (2006.01)

(56) References Cited

U.S. PATENT DOCUMENTS

| | | | |
|---|---|---|---|
| 9,686,839 | B1 | 6/2017 | Chern et al. |
| 10,247,547 | B2 | 4/2019 | Thuries et al. |
| 2008/0240502 | A1* | 10/2008 | Freedman .......... G01B 11/2513 382/103 |
| 2009/0185274 | A1* | 7/2009 | Shpunt ................ G02B 27/425 359/558 |
| 2010/0007717 | A1* | 1/2010 | Spektor .................. G06F 3/017 348/43 |
| 2010/0118123 | A1* | 5/2010 | Freedman ................ F21V 5/04 348/46 |
| 2010/0284082 | A1* | 11/2010 | Shpunt ................ G02B 5/1819 359/558 |
| 2011/0188054 | A1* | 8/2011 | Petronius ............... F21V 13/04 356/610 |
| 2013/0038881 | A1* | 2/2013 | Pesach ............... G01B 11/2513 356/610 |
| 2015/0253123 | A1* | 9/2015 | Braker ............... G01B 11/2531 356/610 |
| 2016/0025993 | A1 | 1/2016 | Mor et al. |
| 2016/0127713 | A1 | 5/2016 | Hazeghi |
| 2016/0127714 | A1 | 5/2016 | Hazeghi et al. |
| 2019/0041197 | A1* | 2/2019 | Gernoth .................... G06T 7/74 |
| 2019/0273905 | A1 | 9/2019 | Wang et al. |

FOREIGN PATENT DOCUMENTS

| | | |
|---|---|---|
| CN | 105319811 A | 2/2016 |
| CN | 205350880 U | 6/2016 |
| CN | 106292144 A | 1/2017 |
| CN | 106406002 A | 2/2017 |
| CN | 106569330 A | 4/2017 |
| CN | 106990548 A | 7/2017 |
| CN | 106990660 A | 7/2017 |
| CN | 107026392 A | 8/2017 |
| CN | 107748475 A | 3/2018 |
| CN | 107908064 A | 4/2018 |

OTHER PUBLICATIONS

PCT International Search Report and the Written Opinion dated Jan. 30, 2019, issued in related International Application No. PCT/CN2018/113780, with partial English translation (10 pages).
First Search dated Dec. 2, 2019, issued in related Chinese Patent Application No. 201711080702.5 (1 page).
First Office Action dated Dec. 10, 2019, issued in related Chinese Patent Application No. 201711080702.5, with English machine translation (13 pages).
PCT International Preliminary Report on Patentability dated May 22, 2020, issued in related International Application No. PCT/CN2018/113778, with English translation (15 pages).
PCT International Preliminary Report on Patentability dated May 22, 2020, issued in related International Application No. PCT/CN2018/113780, with English translation (12 pages).

* cited by examiner

STRUCTURED LIGHT PROJECTION MODULE, DEPTH CAMERA, AND METHOD FOR MANUFACTURING STRUCTURED LIGHT PROJECTION MODULE

CROSS-REFERENCE TO RELATED APPLICATION

This application is a continuation application of International Patent Application No. PCT/CN2018/113780, filed on Nov. 2, 2018, and entitled "STRUCTURED LIGHT PROJECTION MODULE, DEPTH CAMERA, AND METHOD FOR MANUFACTURING STRUCTURED LIGHT PROJECTION MODULE", which is based on and claims priority to and benefit of Chinese Patent Application No. 201711080702.5, filed with China National Intellectual Property Administration (CNIPA) of People's Republic of China on Nov. 6, 2017. The entire contents of all of the above-identified applications are incorporated herein by reference.

TECHNICAL FIELD

The present application relates to a structured light projection module, a depth camera, and a method for manufacturing a structured light projection module.

BACKGROUND

A three-dimensional (3D) imaging technology is a core of a new generation of human-computer interaction technology. As the 3D imaging technology becomes a standard feature for mobile terminal devices, depth cameras will be widely applied to the mobile terminal devices, which makes the depth camera to be developed towards a trend of low power consumption, high performance, and a small volume. A structured light projection module is a core device in the depth camera based on the structured light technology, whose main components are a light source and a diffractive optical element (DOE). The DOE has a function of modulating beams, for example, splitting incident beams to produce emergent beams having a specific structured pattern. A typical solution is to emit a single beam using an emitting laser, and then emit laser speckle patterns using a collimating lens and a DOE, and the speckle patterns are used for calculating a depth image of an object after being captured by a corresponding camera.

Factors such as the intensity and the distribution of the laser speckle patterns may affect the calculation accuracy of the depth image. A higher intensity may increase the contrast of the patterns to further increase the calculation accuracy. However, due to the problem of zero-order diffraction of the DOE, the intensity is required to be not excessively high to avoid the occurrence of safety problems of laser. In Patent Application No. CN2008801199119, it is proposed that double DOEs are used to resolve the problem of zero-order diffraction. The distribution density and the degree of irrelevance of the laser speckle patterns may also affect the calculation accuracy, and the degree of irrelevance of the speckle patterns may be increased by designing the DOE to project irregular speckle patterns. For the distribution density of the speckle patterns, the magnitude of the density may affect the calculation accuracy and the resolution, and more importantly, whether the density distribution is uniform may directly affect whether the depth calculation of each point in the whole field of view has relatively uniform accuracy. For speckle patterns with non-uniform density distribution, after the speckle patterns are further modulated by a three-dimensional object in the space, the non-uniform distribution degree of the speckle patterns may be aggravated, leading to the decrease of the final accuracy of the depth calculation.

A conventional edge-emitting light source can provide sufficient optical power. But due to a large divergence angle, a large volume, and high power consumption, the conventional edge-emitting light source is hardly applied to a micro structured light projection module. However, because of a small volume, a small divergence angle, and low power consumption, a vertical-cavity surface-emitting laser (VCSEL) may become a main choice of a light source in the micro structured light projection module. Generally, a light source of a VCSEL array chip having a plurality of VCSELs may be diffused by the DOE and projected to a target space to form structured light patterns. For example, for speckle patterns, the speckle patterns are required to have randomness (irrelevance) and be distributed uniformly as much as possible. That is, the uniform density distribution of the speckles can increase the calculation accuracy of the depth image.

There are many reasons causing nonuniform density distribution of the speckle patterns. One reason is that the nonuniform density distribution is determined by the diffraction property of the DOE, that is, with the increase of the diffraction angle (or the increase of the diffraction order) of the DOE, the distribution density of speckles may decrease gradually. Another reason is that when the light source includes a plurality of sub-light sources, and the DOE diffracts the plurality of sub-light sources synchronously, sub-speckle patterns formed by the sub-light sources are jointly arranged, easily leading to the nonuniform density distribution.

Although there are many advantages of adopting the VCSEL array chip, the disadvantage lies in that the speckle patterns projected by the structured light projection module may be considered as a combination of the sub-speckle patterns projected by each VCSEL, and the combination form is determined by the arrangement of the sub-light sources on the VCSEL array chip. Therefore, the arrangement of the VCSEL array chip and the sub-speckle patterns are both designed to be randomly arranged, and in this way, it can be ensured that the final speckle patterns have a characteristic of irrelevance. However, in terms of increasing the calculation accuracy, such as ensuring uniform density distribution of the speckles, the randomness of the arrangement of the VCSEL array chip and the randomness of the sub-speckle patterns may both decrease the uniformity of the final projected speckle patterns.

Therefore, how to ensure that the speckle patterns have high irrelevance and that the density distribution of the speckles is uniform as much as possible is a problem that the current design of the micro structured light projection module encounters.

SUMMARY

The embodiments of the present application provide a structured light projection module, a depth camera having the structured light projection module, and a method for manufacturing the structured light projection module, against the disadvantages of the existing technologies.

To implement the embodiments, the present application adopts the following technical solutions.

A structured light projection module includes: a light source including a plurality of sub-light sources arranged in a two-dimensional array and configured to emit two-dimensional patterned beams corresponding to the two-dimensional array; a lens, receiving and converging the two-dimensional patterned beams; and a diffractive optical element, receiving the two-dimensional patterned beams which are emitted out by means of convergence of the lens, and projecting speckle patterned beams. Speckle patterns include a plurality of image patterns corresponding to the two-dimensional patterns, and relationships between adjacent image patterns of the plurality of image patterns at least includes two of an overlapping relationship, adjoining relationship, and a spacing relationship.

In some embodiments, the spacing relationship refers to that an average interval between the adjacent image patterns is greater than or equal to an average interval between speckles in the image patterns.

In some embodiments, the average interval between the adjacent image patterns is one to three times the average interval between speckles in the image patterns.

In some embodiments, the light source is a VCSEL array light source.

In some embodiments, the two-dimensional patterns include irregularly distributed speckles.

In some embodiments, the image patterns and the two-dimensional patterns are in a central symmetry relationship.

In some embodiments, the speckle patterns are composed of the plurality of image patterns corresponding to the two-dimensional patterns, and the plurality of image patterns is in an irregular arrangement.

The present application further provides a depth camera, including: the structured light projection module described above, used for projecting speckle patterned beams to an object; a capture module, used for capturing the speckle patterns on the object; and a processor, receiving the speckle patterns and performing depth calculation to obtain a depth image of the object.

In some embodiments, a size of a matching window selected in the speckle patterns is not less than a gap between the adjacent image patterns in the depth calculation.

In some embodiments, a baseline between the structured light projection module and the capture module is not parallel to any side of the image patterns and/or the speckle patterns.

The present application further provides a method for manufacturing a structured light projection module, including: providing a substrate, where a material of the substrate is copper or ceramic; arranging a light source on the substrate, where the light source includes a plurality of sub-light sources arranged in a two-dimensional array and configured to emit two-dimensional patterned beams corresponding to the two-dimensional array; arranging a lens on the substrate, for receiving and converging the two-dimensional patterned beams; and arranging a diffractive optical element on the substrate, for receiving the two-dimensional patterned beams which are emitted out by means of convergence of the lens, and projecting speckle patterned beams, where speckle patterns include a plurality of image patterns corresponding to two-dimensional patterns, and relationships between adjacent image patterns of the plurality of image patterns at least includes two of an overlapping relationship, an adjoining relationship, and a spacing relationship.

In the first aspect of the present application, a structured light projection module is provided. The module comprises: a light source, comprising a plurality of sub-light sources arranged in a two-dimensional array and configured to emit two-dimensional patterned beams corresponding to the two-dimensional array, and the two-dimensional patterned beams comprising two-dimensional patterns; a lens, receiving and converging the two-dimensional patterned beams; and a diffractive optical element, receiving the two-dimensional patterned beams converged and emitted from the lens, and projecting speckle patterned beams corresponding to speckle patterns, wherein the speckle patterns comprise a plurality of image patterns corresponding to the two-dimensional patterns, and relationships between adjacent image patterns of the plurality of image patterns comprise at least two of an overlapping relationship, an adjoining relationship, and a spacing relationship.

In some embodiments, the at least two relationships comprise the spacing relationship.

In the second aspect of the present application, a depth camera is provided. The camera comprises a structured light projection module, a capture module, and a processor. The structured light projection module comprises: a light source, comprising a plurality of sub-light sources arranged in a two-dimensional array and configured to emit two-dimensional patterned beams corresponding to the two-dimensional array, and the two-dimensional patterned beams comprising two-dimensional patterns; a lens, receiving and converging the two-dimensional patterned beams; and a diffractive optical element, receiving the two-dimensional patterned beams converged and emitted from the lens, and projecting speckle patterned beams corresponding to speckle patterns to an object, wherein the speckle patterns comprise a plurality of image patterns corresponding to the two-dimensional patterns, and relationships between adjacent image patterns of the plurality of image patterns comprise at least two of an overlapping relationship, an adjoining relationship, and a spacing relationship. The capture module is used for capturing speckle patterns projected on the object. The processor is configured for receiving the collected speckle patterns and performing a depth calculation to obtain a depth image of the object.

In the third aspect of the present application, a method for manufacturing a structured light projection module is provided. The method comprises: providing a substrate, wherein a material of the substrate comprises copper or ceramic; arranging a light source on the substrate, wherein the light source comprises a plurality of sub-light sources arranged in a two-dimensional array and configured to emit two-dimensional patterned beams corresponding to the two-dimensional array, and the two-dimensional patterned beams comprising two-dimensional patterns; arranging a lens on the substrate, for receiving and converging the two-dimensional patterned beams; and arranging a diffractive optical element on the substrate, for receiving the two-dimensional patterned beams converged and emitted from the lens, and projecting speckle patterned beams corresponding to speckle patterns, wherein the speckle patterns comprise a plurality of image patterns corresponding to the two-dimensional patterns, and relationships between adjacent image patterns of the plurality of image patterns comprise at least two of an overlapping relationship, an adjoining relationship, and a spacing relationship.

The present application provides a structured light projection module, projecting speckle patterns including a plurality of image patterns corresponding to the arrangement patterns of the light source of the structured light projection module. The relationships of adjacent image patterns may include at least two of a spacing relationship, an adjoining relationship, and an overlapping relationship. Compared with the existing technologies, in the present application, the distribution of the speckle patterns projected has higher irrelevance, and the depth camera based on the structured light projection module may implement three-dimensional measurement with high accuracy.

DETAILED DESCRIPTION OF THE INVENTION

Embodiments of the present application are described below in detail. It should be emphasized that the description includes some embodiments of the present application, and does not limit the scope and the applications of the present application.

Figure 1:
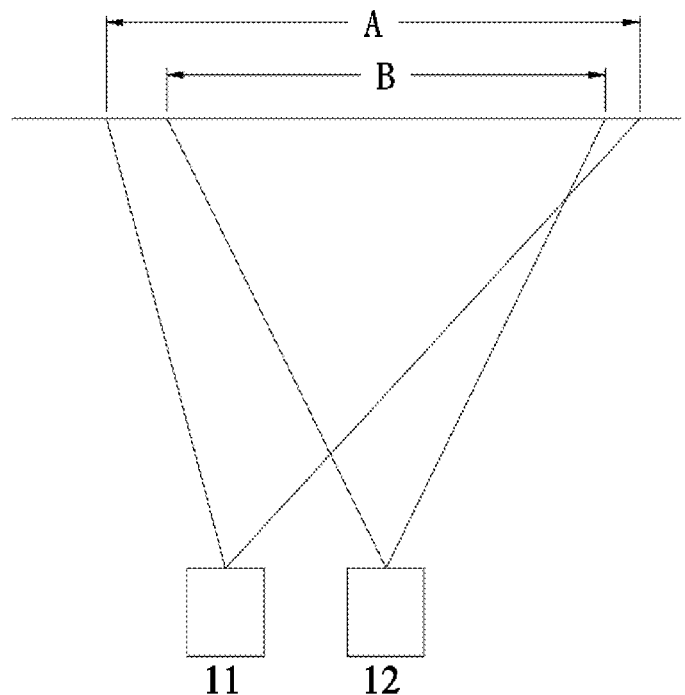
FIG. 1 is a schematic diagram of a depth camera based on a structured light technology, according to an embodiment of the present specification.

FIG. 1 is a schematic diagram of a depth camera, based on a structured light technology. The depth camera includes a structured light projection module 11 and a capture module 12. The structured light projection module is used for projecting structured light patterns to a space projection area A, and the capture module is used for capturing the structured light patterns projected on an object in a collection area B. Generally, the projection area A is not smaller than the collection area B of the capture module, so as to ensure that the object in the collection area corresponding to the capture module can all be covered by the structured light patterns. In addition, the depth camera further includes a processor, used for receiving the structured light patterns captured by the capture module, and performing a depth calculation on the captured structured light patterns to obtain a depth image.

Generally, the depth calculation is to perform a matching calculation on the current captured structured light patterns and reference structured light patterns captured and saved in advance, so as to obtain a deviation value of pixels in the current structured light patterns relative to corresponding pixels in the reference structured light patterns. A depth value can be obtained through a calculation based on the deviation value, and depth values of a plurality of pixels form the depth image. The deviation value herein generally refers to a deviation value along a baseline direction. Therefore, generally, the structured light patterns are required to have quite high irrelevance along the baseline direction, to avoid mismatching.

In an embodiment, the structured light projection module is used for projecting infrared speckle patterns, the capture module is a corresponding infrared camera, and the processor is a dedicated system on chip (SOC). When the depth camera used as an embedded device is integrated into another computing terminal, such as a computer, a tablet computer, a mobile phone, a television, a game console, or an Internet of Things (IoT) device, the function implemented by the foregoing processor may be completed by a processor or an application in the terminal. For example, the depth calculation function is stored in a memory in a form of a software module, and is invoked by the processor in the terminal to implement the depth calculation.

The structured light projection module mainly comprises a VCSEL array chip, a lens, and a diffractive optical element (DOE). After the light being converged by the lens and modulated by the DOE, the light source chip emits structured light patterns such as speckle patterns to the space.

Figure 2:
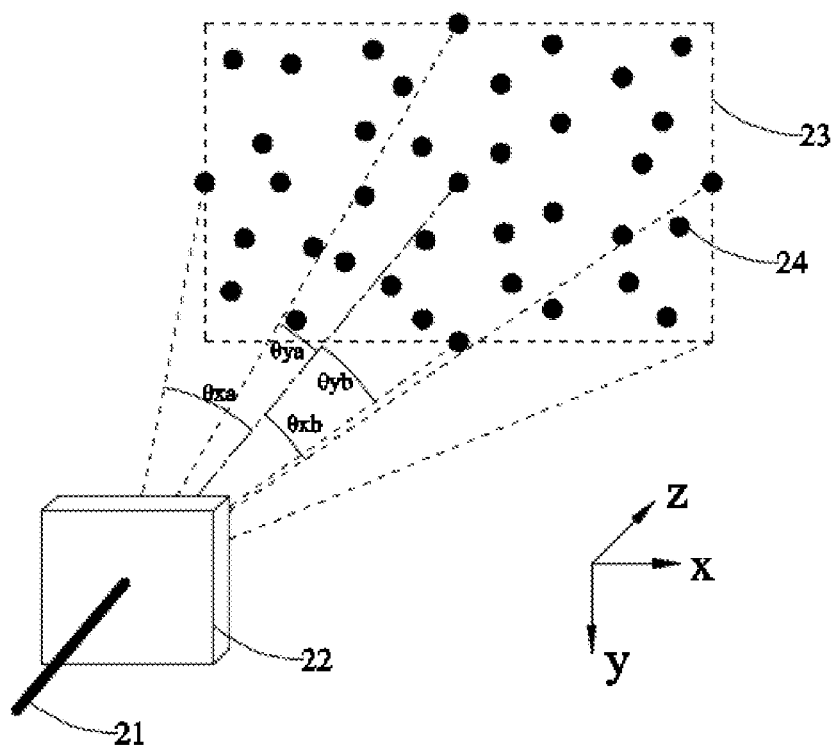
FIG. 2 is a schematic diagram of forming speckle patterns after a single beam goes through a DOE, according to an embodiment of the present specification.

FIG. 2 is a schematic diagram of forming speckle patterns after a single beam goes through a DOE. A beam 21 is vertically incident onto a DOE 22, and a speckle pattern 24 is projected on a plane at a distance of D from the DOE after the beam 21 is diffracted. The plane at which the DOE is located is set as an xoy plane, a direction in which an optical axis is located is set as a z direction. A direction of a connection line between the structured light projection module 11 and the capture module 12 is parallel to a x direction. In some embodiments, the baseline direction may include other directions. An area formed by the speckle patterns is area 23, and the area refers to a minimum rectangular area 23 that may include all the speckles 24. Adjacent edges of the rectangular area 23 are respectively parallel to the x axis and the y axis, and there is at least one speckle at each edge. Generally, the diffraction order of the speckle is the highest order along the direction. Starting from the z axis in which the optical axis is located, angles formed by four edges of the rectangular area and the z axis are respectively $\theta_{xa}$, $\theta_{xb}$, $\theta_{ya}$, and $\theta_{yb}$. Centered at the optical axis, the four angles may be used for representing the diffraction divergence angles of the DOE 22, and an angle range of the diffraction speckle pattern area 23 formed after the beam 21 passing through the DOE 22 is further defined.

Locations of speckles 24 in the speckle area 23 are determined by a diffraction equation:

$$\sin \theta_x = m_x \lambda / P_x \qquad (1)$$

$$\sin \theta_y = m_y \lambda / P_y \qquad (2)$$

In the foregoing equations, $\theta_x$ and $\theta_y$ respectively refer to the diffraction angles along the x direction and the y direction, $m_x$ and $m_y$ respectively refer to the diffraction orders along the x direction and the y direction, $\lambda$ refers to a wavelength of the beam 21, and $P_x$ and $P_y$ respectively refer to periods of the DOE 22 along the x direction and the y direction, that is, a size of a basic unit.

The arrangement of the speckle patterns 24 depends on the diffraction angles of the diffraction-order beams of the DOE, and the diffraction angle is determined by the performance of the DOE.

FIG. 2 shows a situation in which the beam is vertically incident into the DOE. It may be understood that when the beam is incident at a certain angle, the diffraction area 23 may slightly deviate compared to the situation when the beam is vertically incident. In addition, when the single light source is replaced with a plurality of sub-light sources, for example, the VCSEL array chip, a formed diffraction area may be considered as a combination of sub-diffraction areas formed by the various single beams.

Figure 3:
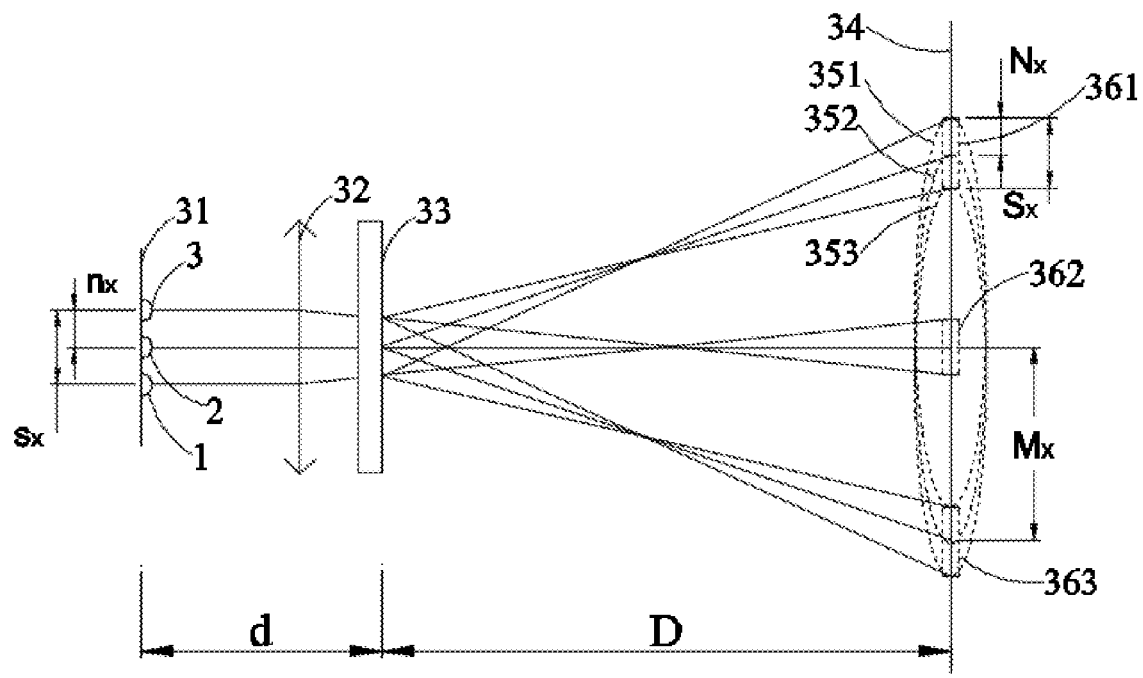
FIG. 3 is a schematic diagram of a structured light projection module, according to an embodiment of the present application.

FIG. 3 is a schematic diagram of a structured light projection module, according to an embodiment of the present application. The structured light projection module includes an array 31 (such as a VCSEL array chip) composed of a plurality of light sources, a lens 32, and a DOE 33. For convenience, merely three sub-light sources (which are respectively a sub-light source 1, a sub-light source 2, and a sub-light source 3 from the bottom to the top in the figure) are shown in a one-dimensional x direction in the figure. In an actual embodiment, the quantity of light sources may be up to dozens or even tens of thousands, the light sources may alternatively be arranged in two dimensions, and the arrangement may be regular or irregular. In the description below, only regular arrangement in one dimension is described, and the description below is also applicable to other situations.

Beams emitted from the light source array 31 may form patterned beams corresponding to the light source arrangement. The patterned beams are converged by the lens 32 and then incident onto the DOE 33, and then becomes speckle patterned beams projected into the space by the DOE 33. When the patterned beams are incident onto the plane at the distance of D from the DOE, the speckle patterns may be projected. The convergence herein means that the lens converges the incident beams with a certain divergence angle and then emits the emergent beams with a smaller divergence angle. An interval between the sub-light sources 31 is $n_x$, and a size of an area in which the sub-light sources are located is $s_x$. If the sub-light sources are arranged in two dimensions, the interval may be represented as n ($n_x$, $n_y$). Similarly, a size of the area in which the sub-light sources are located is s ($s_x$, $s_y$). A distance between the light source 31 and the DOE 33 is d, and in some embodiments, d is approximately equal to a focal length of the lens 32.

The lens 32 may be a single lens, or may be a lens combination comprising a plurality of lenses. In some embodiments, the lens 32 is used for collimating the beams emitted from the light source 31.

Non-correlated light sources may be used as the sub-light sources. In this case, an interference effect between the sub-light sources may be omitted. Therefore, the beams emitted from the sub-light sources 1, 2, and 3 respectively form sub-speckle patterns 351, 352, and 353 (which are represented by oval dotted lines in the figure) after passing through the DOE 33. A final speckle pattern is formed by combining the sub-speckle patterns 351, 352, and 353. In the embodiment shown in FIG. 3, because the diffraction divergence angle of the DOE 33 is large, the sub-speckle patterns overlap with each other. In some embodiments, the overlapping degree may be adjusted by setting the diffraction divergence angle of the DOE 33. In an embodiment shown in FIG. 4, there is no overlapping between sub-speckle patterns 451, 452, and 453.

In FIG. 3, each of the sub-speckle patterns may comprise three speckles, respectively corresponding to diffraction beams at orders of −1, 0, and +1. This is merely an example. The quantity of speckles may be various, and the speckles may be distributed in two dimensions. For grating diffraction, when the light source moves along a direction parallel to a grating plane, the diffraction beams of the light source may also move accordingly, that is, the speckles move accordingly, based on the following relationship:

$$T = tD/d \qquad (3)$$

In the formula, t and T respectively represent the translation of the light source and the translation of the diffraction speckles. Therefore, a speckle pattern formed by one sub-light source may be considered as a speckle pattern formed by another sub-light source through translating. The relationship between a distance between the diffraction speckles of corresponding orders in the two sub-speckle patterns and a distance between the two sub-light sources may be determined by the formula.

Therefore, the size of areas (such as 361, 362, and 363, which are represented by rectangular dotted lines in the figure) jointly formed by speckles with the same diffraction order corresponding to the plurality of sub-light sources and an interval between the speckles in the areas may be obtained through calculations using the following formulas:

$$N_x = n_x D/d \qquad (4)$$

$$S_x = s_x D/d \qquad (5)$$

In the formulas, $S_x$ and $N_x$ respectively represent the size of the area formed by speckles with the same diffraction order and the interval between the speckles in the area. Based on the foregoing formulas that, relationships between the size of the area and the interval between the speckles in the area, and the size of the light source 31 and the interval between the sub-light sources, are the same as those in the pinhole imaging model of the lens. Therefore, the areas 361, 362, and 363 may be considered as images formed by the light source 31. That is, the final projected diffraction beams are formed by combining the patterned beams emitted by a plurality of light sources. In other words, the speckle pattern finally formed on the plane 34 is formed by combining image patterns of the arrangement patterns of a plurality of light sources. In FIG. 3, there is no overlapping between image patterns 361, 362, and 363. In some embodiments, there may be overlapping between image patterns. For example, in the embodiment shown in FIG. 4, there is overlapping between the image patterns 461, 462, and 463. One of factors for determining whether the image patterns overlap is an interval $M_x$ between diffraction speckles at adjacent diffraction orders, and the distance is determined by the performance of the DOE. It may be understood that the image patterns and the arrangement patterns of the light source may be in a central symmetrical imaging relationship, or the lens may be designed to implement other imaging relationships, such as replication (for example, a replica relationship formed between image patterns), mirroring (for example, an axial symmetrical mirror relationship formed between image patterns), or rotation (for example, there is a certain rotation angle between image patterns, such as 30 degrees, 45 degrees, 60 degrees, or another proper degree).

Figure 4:
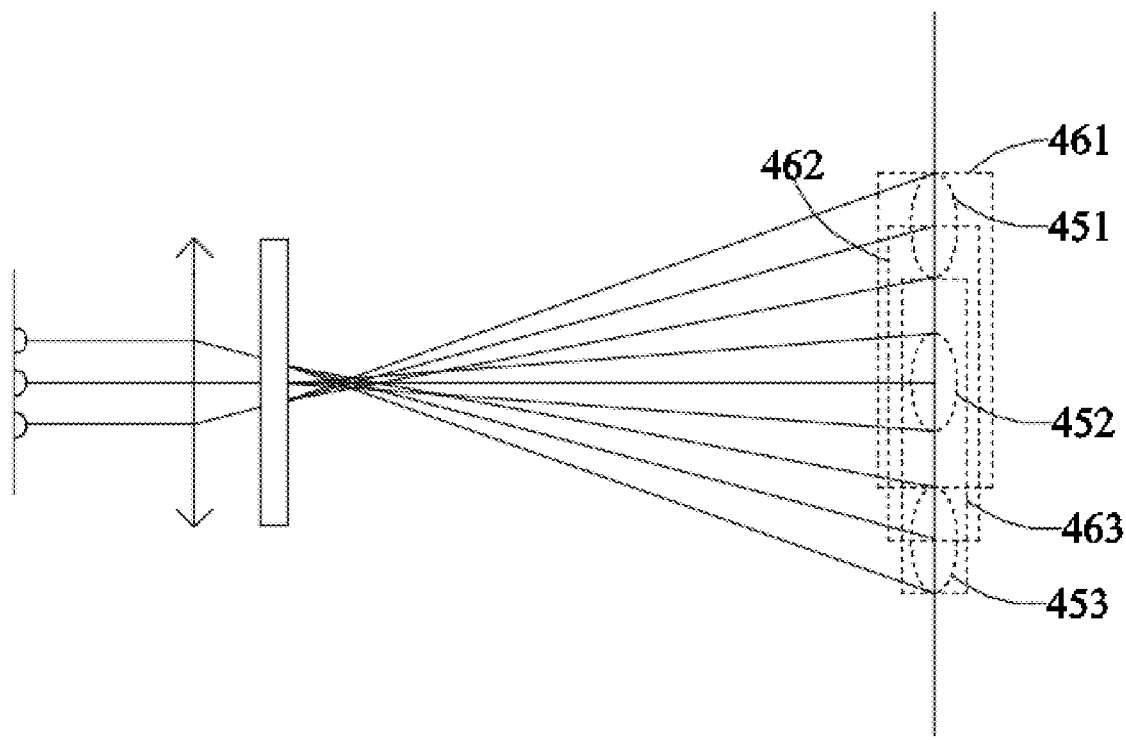
FIG. 4 is a schematic diagram of a structured light projection module, according to an embodiment of the present application.
Figure 5:
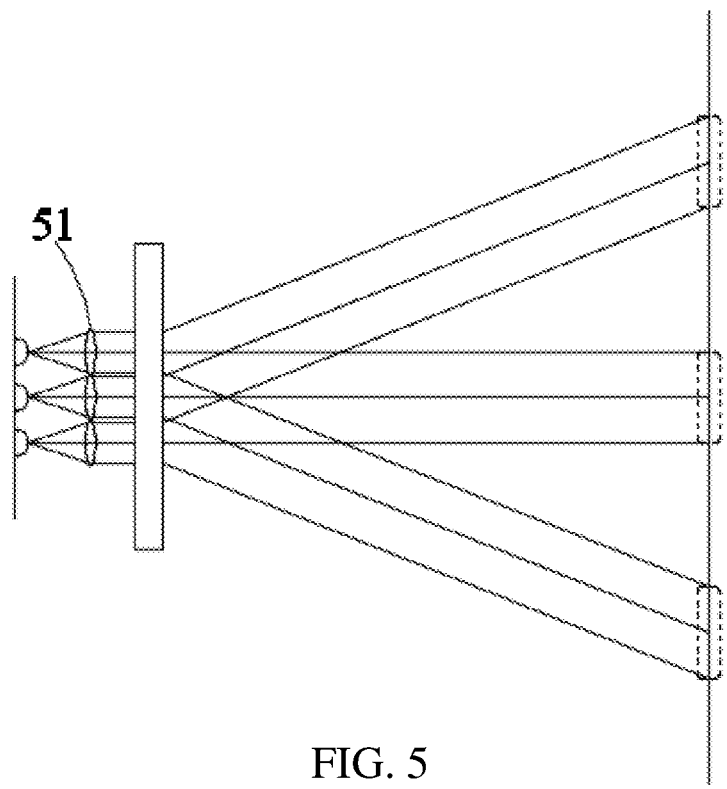
FIG. 5 is a schematic diagram of a structured light projection module having a micro lens array, according to an embodiment of the present application.

In the embodiments shown in FIG. 3 and FIG. 4, the light sources are distributed around the optical axis of the lens. Therefore, the center of beams of the sub-light sources that are far away from the optical axis may be not parallel to the optical axis after being converged by the lens. The deviation may cause the distortion of the image patterns that are far away from the optical axis, thereby making the density of the whole speckle patterns nonuniform. Therefore, the nonuniform phenomenon may be eliminated as much as possible by decreasing the size of the light source. The distortion phenomenon of the image patterns may also be decreased by changing the form of the lens, for example, in an embodiment shown in FIG. 5, a lens 51 is a micro lens array. It should be noted that although the distortion in the embodiment shown in FIG. 5 becomes smaller, the whole diffraction angle may also become smaller compared to the diffraction angles in the embodiments shown in FIG. 3 and FIG. 4.

In addition to that the distortion may influence the density distribution, more important influence factors are the arrangement interval of the light sources and the performance of the DOE (i.e., intervals between speckles at different diffraction orders). The final density distribution of the speckle patterns may be uniform only when a certain constraint condition between the two factors is satisfied. This is described below in detail.

It can be learned from the analysis of the embodiment shown in FIG. 3 that, the speckle patterns projected by the structured light projection module may be considered as being formed by combining the sub-speckle patterns formed respectively by diffraction of the plurality of sub-light sources, or may also be considered as being formed by combining the image patterns of the arrangement patterns of the plurality of light sources. In the present application, the latter is used as an example for description below.

Figure 6:
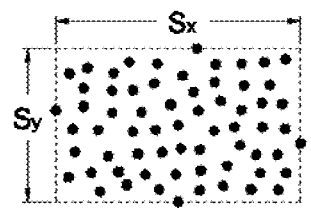
FIG. 6 is a diagram of an image pattern comprising speckles with a same diffraction order corresponding to a plurality of sub-light sources, according to an embodiment of the present application.

The plane at the distance of D from the DOE and the regularly arranged two-dimensional light sources are selected as an example for description. A size of the light source array is s ($s_x$, $s_y$), and an interval between the sub-light sources is n ($n_x$, $n_y$). Therefore, a size of an image pattern formed on the plane at the distance of D from the DOE is S ($S_x$, $S_y$), and an interval between speckles in the pattern is N ($N_x$, $N_y$). As shown in FIG. 6, their relationships are as follows:

$$N=nD/d \quad (6)$$

$$S=sD/d \quad (7)$$

Figure 7:
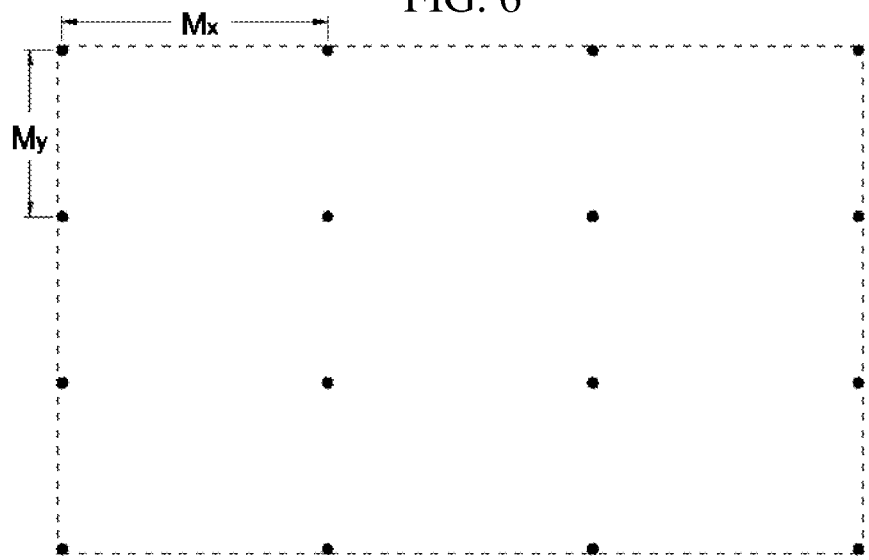
FIG. 7 is a diagram of a speckle pattern formed on a plane at a distance of D from a DOE after a single beam is incident into the DOE, according to an embodiment of the present application.

The speckle patterns finally formed on the plane at the distance of D from the DOE are formed by a plurality of image patterns arranged at a certain interval, and the interval herein refers to the interval between speckles at different diffraction orders after the diffraction of the DOE. Therefore, the density distribution of the speckle patterns is determined by the distribution of speckles and the interval of the image patterns. FIG. 6 is a schematic diagram of an image pattern whose size is S ($S_x$, $S_y$), and an average interval between speckles in the pattern is N ($N_x$, $N_y$). It may be understood that the two-dimensional arrangement of the light sources in this embodiment may be irregular two-dimensional arrangement. FIG. 7 shows speckle patterns formed on the plane at the distance of D from the DOE after a single beam is incident into the DOE, in which different speckles represent different diffraction orders, and an interval between adjacent diffraction orders is M ($M_x$, $M_y$). The final speckle patterns formed by the structured light projection module may be considered as the image patterns shown in FIG. 6 combined according to the arrangement shown in FIG. 7. One combination manner is overlapping the centers of the image patterns with the speckles in FIG. 7 to form the final speckle patterns, such as the combination illustrated in FIG. 8.

Figure 8:
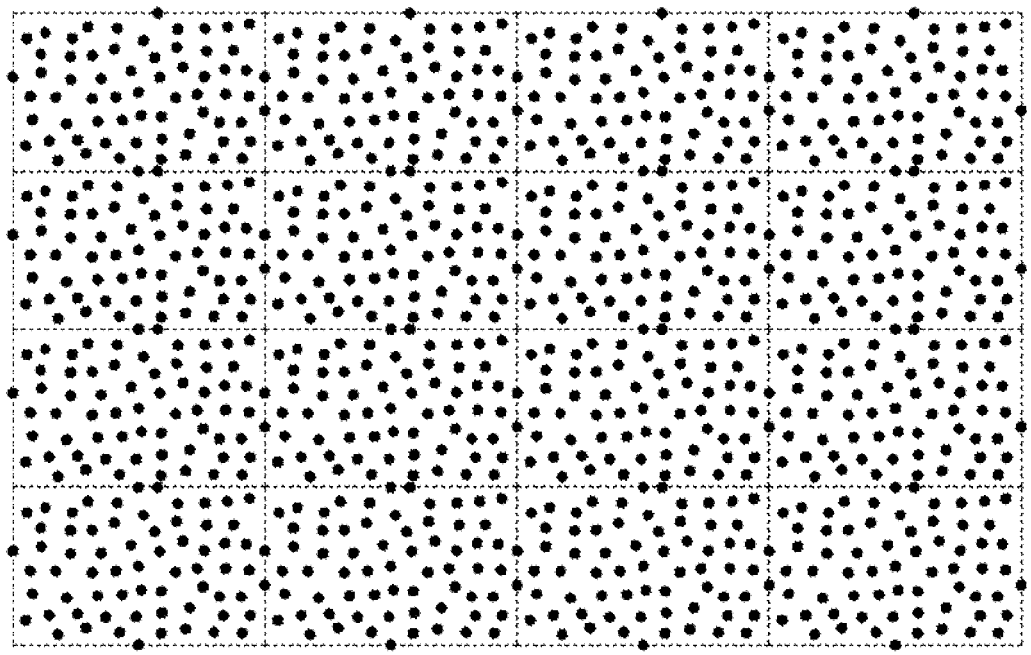
FIG. 8 is a diagram in which a final speckle pattern is formed by overlapping centers of image patterns corresponding to different diffraction orders with the speckles in FIG. 7, according to an embodiment of the present application.

In the speckle patterns formed by a projection module shown in FIG. 8, M=S, (($M_x$=$S_x$) & ($M_y$=$S_y$)). Neighboring image patterns are adjoined to each other, that is, edges of the image patterns exactly overlap with each other, and an interval G ($G_x$, $G_y$)=M−S=0. Generally, since there may be a high-order diffraction speckle at edges of each image pattern, when the edges overlap, the high-order speckles in the adjacent patterns may overlap or be too close to each other. As a result, the quantity of speckles may be reduced, and some speckle areas may be enlarged or the density of some areas may be increased.

FIG. 7 corresponds to the diffraction performance of the DOE. In this embodiment, for producing speckle patterns having a relatively uniform density, the arrangement in FIG. 7 is regular. Although the finally produced speckle pattern shown in FIG. 8 has relatively high randomness in a partial area (a single image pattern area), the whole speckle pattern may still be considered as regular arrangement if the image pattern is regarded as a unit. It may be understood that the whole speckle pattern has a low irrelevance, because any small area in a single replication area, a plurality of speckle layouts that is the same as that in the small area can be found along the x direction or another direction.

Therefore, how to resolve the contradiction between the uniform density distribution and the high irrelevance is an important issue of the design of speckle patterns.

Figure 9:
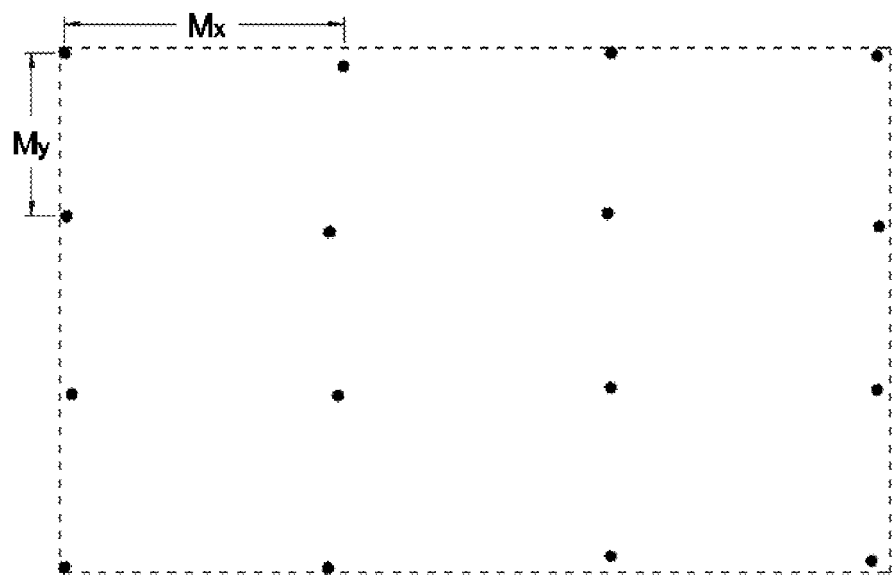
FIG. 9 is a diagram of a speckle pattern formed on a plane at a distance of D from a DOE after a single beam is incident into the DOE, according to an embodiment of the present application, and the speckle pattern is randomly arranged in a certain degree.
Figure 10:
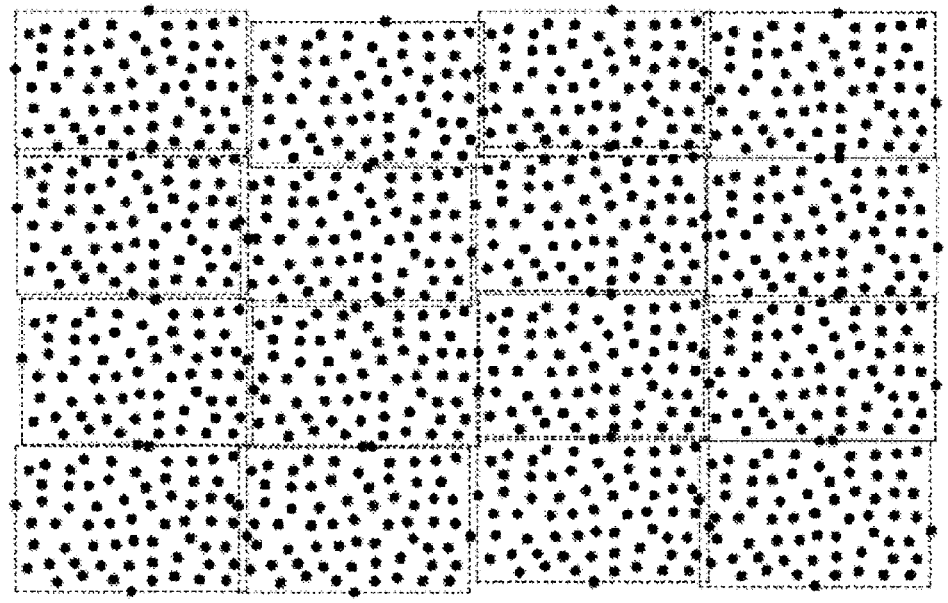
FIG. 10 is a diagram in which a final speckle pattern is formed by overlapping centers of image patterns corresponding to different diffraction orders with the speckles in FIG. 9, according to an embodiment of the present application.

FIG. 9 is a schematic diagram of a pattern formed by a single beam through the DOE, according to an embodiment of the present application. Relevant to the pattern shown in FIG. 7, on the basis of a regular arrangement, some randomness is added to the arrangement, thereby improving the irrelevance. The average interval between speckles in FIG. 9 is almost unchanged compared to the embodiment shown in FIG. 7. FIG. 10 is a speckle pattern formed by combing the image patterns shown in FIG. 6 according to the arrangement shown in FIG. 9. Compared with FIG. 8, the degree of irrelevance of the speckle pattern in this embodiment is improved. For example, due to the staggering of the randomly generated image patterns, the irrelevance of a randomly selected sub-area along the baseline x direction can be improved. FIG. 10 is similar to FIG. 8 in that, the entire distribution of the speckles in the pattern is relatively dense. The adjacent image patterns may be spacing (gapping), adjoining, or overlapping with each other due to the random arrangement. Since there are three connection manners at the same time, the distribution density of the speckle pattern is decreased compared to the uniformity shown in FIG. 8, and the problem of speckles overlap easily occurs. It may be understood that the increase in randomness may enlarge the gap between the adjacent image patterns or the amplitude of overlapping, and the nonuniformity may also be increased. In addition, due to the randomness, any two of spacing, adjoining, or overlapping relationships may exist between the adjacent image patterns.

Figure 11:
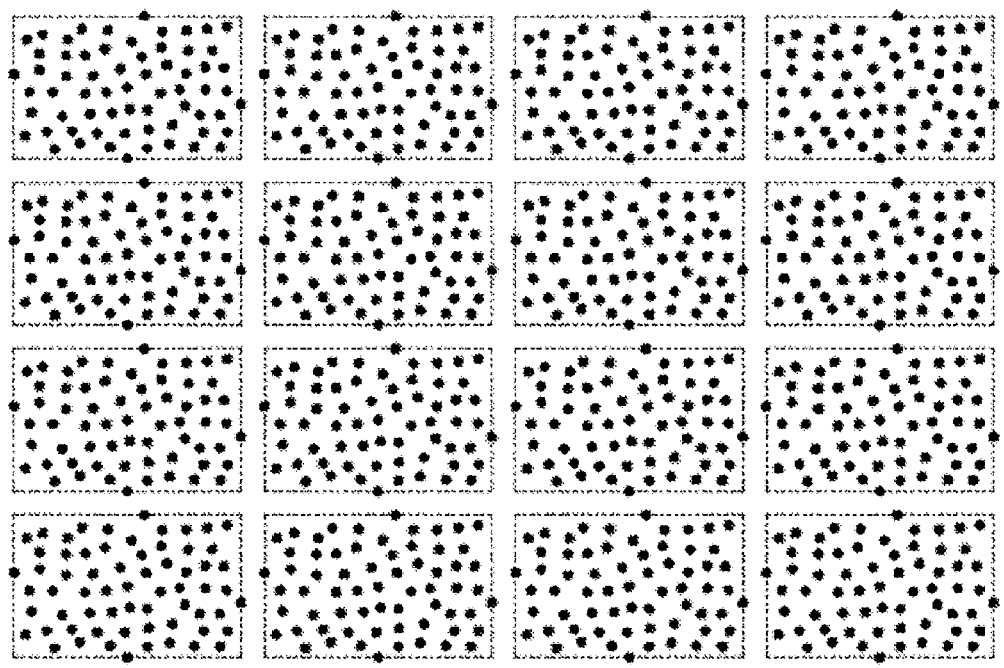
FIG. 11 is a diagram of a speckle pattern having a regular gap, according to an embodiment of the present application.

FIG. 11 is a diagram of a speckle pattern having a regular gap, according to an embodiment of the present application. Compared with FIG. 8, in the speckle pattern provided in FIG. 11, an obvious interval exists between the adjacent image patterns. In this way, an area of the speckle pattern may be increased, that is, a field-of-view angle is increased.

Figure 12:
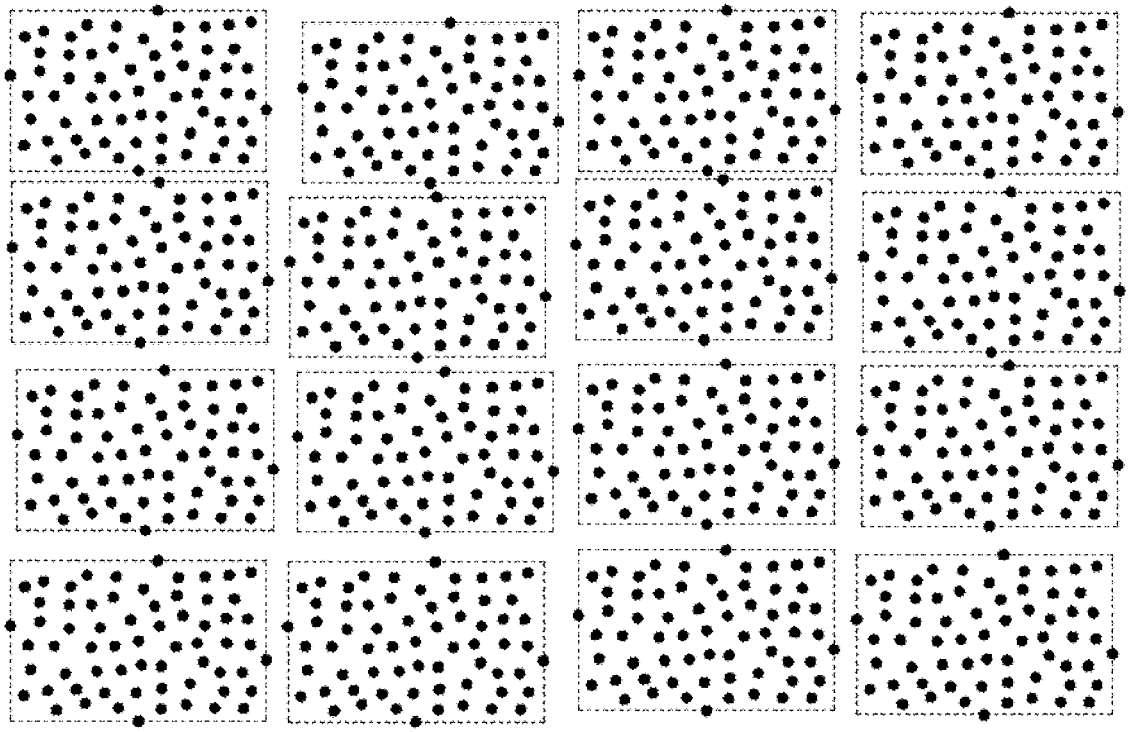
FIG. 12 is a diagram of a speckle pattern having an irregular gap, according to an embodiment of the present application.

FIG. 12 is a diagram of a speckle pattern having an irregular gap, according to an embodiment of the present application. Compared with FIG. 10, an average interval between the adjacent image patterns becomes larger, and the randomness is higher. As a result, a spacing relationship exists between the adjacent image patterns (or the adjacent patterns are in a spacing state), and therefore the degree of irrelevance may be further increased. In addition, compared with the embodiments in FIG. 8 and FIG. 10, the speckle overlapping problem is solved, and the field-of-view angle is also increased.

It should be noted that the spacing relationship between the adjacent image patterns refers to an obvious gap (a gap that is not caused by an error) between the adjacent image patterns. That is, the border of the adjacent image patterns may be easily recognized in the speckle pattern. In other words, the spacing relationship is the design objective of the projection module, and is intended to make the adjacent image patterns not adjoined or overlapped to each other, such that the gap between the image patterns is not obvious. For example, speckles at the edges of the adjacent image patterns overlap, an interval between speckles at the edges of the adjacent image patterns is close to the interval between speckles inside the image patterns, or the adjacent image patterns partially overlap. Generally, due to the randomness, intervals between the image patterns cannot be the same. Overall, when an average intervals between image patterns is not less than an average interval between speckles in the image patterns, a speckle pattern may have an obvious gap as shown in FIG. 11 or FIG. 12, that is, G>N. In addition, due to technique factors such as partial processing accuracy or element installation accuracy, a quite small number of the adjacent image patterns may deviate from the design objective and cause minor overlapping or adjoining. These technique errors are permitted in the protection scope of the present application. This does not mean that the technical solution of the present application needs to exclude these types of error unconditionally, as long as most of the adjacent image patterns have a sufficiently obvious gap.

Due to the obvious gap, when depth calculation is performed based on the speckle patterns, selection of a matching window generally needs to consider a size of the gap, and a size of the matching window is theoretically not smaller than the size of the gap in the same direction.

Figure 13:
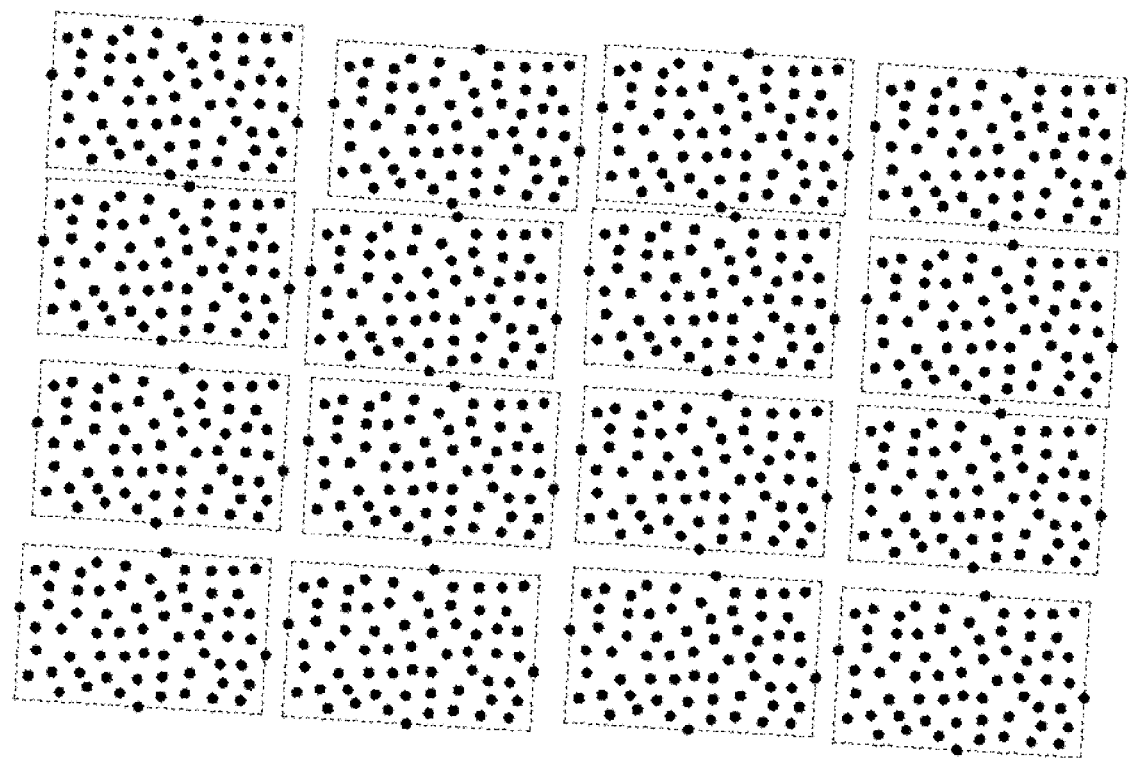
FIG. 13 is a diagram of a rotated speckle pattern, according to an embodiment of the present application.

In the foregoing description, a square shape of the image patterns and a whole shape of the final speckle pattern are generally respectively parallel to the x axis and the y axis (that is, two edges of the square are respectively parallel to the x axis and the y axis), and the baseline between the structured light projection module and the capture module is in the x direction. In some embodiments, to further improve the irrelevance, the shape of the speckle pattern may be rotated, so the baseline is not parallel to any edge of the speckle pattern and/or the image pattern. That is, a certain angle is produced between the baseline and an edge of the speckle pattern and/or the image pattern that is originally parallel to the direction of the baseline. Therefore, the irrelevance of the speckle pattern along the direction of the baseline may be further improved to increase the depth calculation accuracy. FIG. 13 is a diagram of a rotated speckle pattern. It is verified that, to ensure that the whole field-of-view area of the capture module is filled with the speckle patterns, the angle is to be not excessively large. For example, the angle is 2 degrees to 10 degrees. Due to the randomness, the edges of the speckle pattern described herein may not be straight edges, and may be a general direction of the arrangement of the image patterns in the speckle pattern. The rotation manner herein is applicable to situations of all the foregoing embodiments in the present application.

Figure 14:
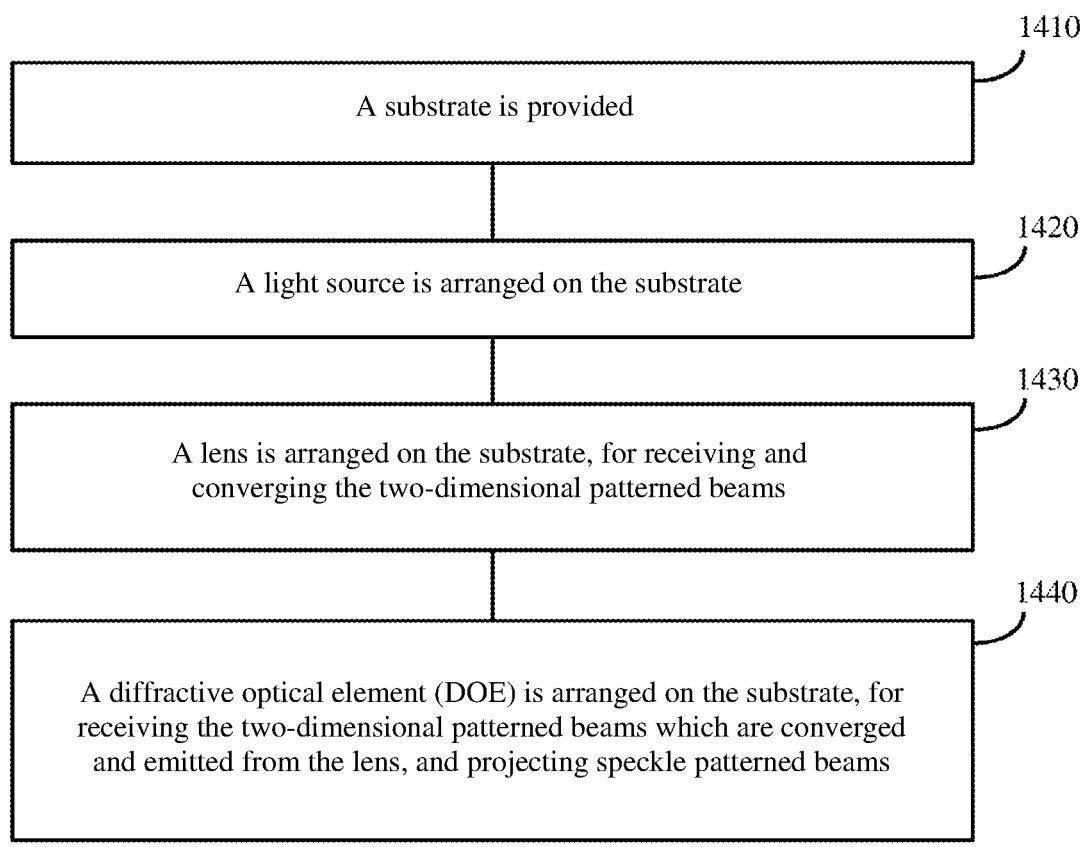
FIG. 14 is a flowchart of a method for manufacturing a structured light projection module, according to an embodiment of the present application.

The present application further provides a method for manufacturing a structured light projection module. As shown in FIG. 14, the method includes step 1410 to step 1440.

In step 1410, a substrate is provided. A material of the substrate may comprise copper or ceramic.

In step 1420, a light source is arranged on the substrate. The light source may include a plurality of sub-light sources that are arranged in a two-dimensional array and used for emitting two-dimensional patterned beams corresponding to the two-dimensional array.

In step 1430, a lens is arranged on the substrate, for receiving and converging the two-dimensional patterned beams.

In step 1440, a diffractive optical element (DOE) is arranged on the substrate, for receiving the two-dimensional patterned beams which are converged and emitted out by the lens, and projecting speckle patterned beams. The speckle patterns may include a plurality of image patterns corresponding to the two-dimensional patterns, and a relationship between the adjacent image patterns of the plurality of image patterns at least includes two of an overlapping relationship, an adjoining relationship, and a spacing relationship.

The structured light projection module manufactured according to this embodiment of the present application may project the speckle patterns including a plurality of image patterns corresponding to the arrangement patterns of the light source of the structured light projection module, and the adjacent image patterns are in a spacing state. Compared with the existing technologies, the distribution of the speckle patterns projected by the structured light projection module manufactured according to this embodiment of the present application has higher irrelevance, and a depth camera based on the structured light projection module may implement three-dimensional measurement with high accuracy.

Further, the substrate of the structured light projection module according to this embodiment of the present application may use a copper or ceramic substrate instead of a conventional semiconductor substrate. Compared with the semiconductor substrate, copper or ceramic substrate can improve the heat dissipation performance of the whole structured light projection module.

In some embodiments, the spacing relationship may refer to that an average interval between the adjacent image patterns is greater than or equal to an average interval between speckles in the image patterns.

In some embodiments, the average interval between the adjacent image patterns may be one to three times the average interval between speckles in the image patterns.

In some embodiments, the light source comprise a VCSEL array light source.

In some embodiments, the two-dimensional patterns are irregularly distributed speckles.

In some embodiments, the image patterns and the two-dimensional patterns are in a central symmetry relationship.

In some embodiments, the speckle patterns may comprise the plurality of image patterns corresponding to the two-dimensional patterns, the plurality of image patterns is in an irregular arrangement.

The above content includes further detailed descriptions of the present application with reference to specific embodiments, and the specific implementation of the present application is but limited to these descriptions. For a person of ordinary skill in the art of the present application, various replacements or variations may be performed on the implementations described above without departing from the conception of the present application, and these replacements or variations should be regarded as falling within the protection scope of the present application.

What is claimed is:

1. A structured light projection module, comprising:
a light source, comprising a plurality of sub-light sources arranged in a two-dimensional array and configured to emit two-dimensional patterned beams corresponding to the two-dimensional array, and the two-dimensional patterned beams comprising two-dimensional patterns;
a lens, receiving and converging the two-dimensional patterned beams; and
a diffractive optical element, receiving the two-dimensional patterned beams converged and emitted from the lens, and projecting speckle patterned beams corresponding to speckle patterns, wherein
the speckle patterns comprise a plurality of image patterns corresponding to the two-dimensional patterns, and relationships between adjacent image patterns of the plurality of image patterns comprise at least two of an overlapping relationship, an adjoining relationship, and a spacing relationship, and
the spacing relationship refers to that an average interval between the adjacent image patterns is greater than or equal to an average interval between speckles in the plurality of image patterns.

2. The structured light projection module according to claim 1, wherein the average interval between the adjacent image patterns is one to three times the average interval between the speckles in the plurality of image patterns.

3. The structured light projection module according to claim 1, wherein the light source is a vertical-cavity surface-emitting laser (VCSEL) array light source.

4. The structured light projection module according to claim 1, wherein the two-dimensional patterns include irregularly distributed speckles.

5. The structured light projection module according to claim 1, wherein the plurality of image patterns and the two-dimensional patterns are in a central symmetry relationship.

6. The structured light projection module according to claim 1, wherein the speckle patterns are composed of the plurality of image patterns corresponding to the two-dimensional patterns, wherein the plurality of image patterns is in an irregular arrangement.

7. The structured light projection module according to claim 1, wherein the at least two relationships comprise the spacing relationship.

8. A depth camera, comprising:
a structured light projection module comprising:
a light source, comprising a plurality of sub-light sources that arranged in a two-dimensional array and configured to emit two-dimensional patterned beams corresponding to the two-dimensional array, and the two-dimensional patterned beams comprising two-dimensional patterns;
a lens, receiving and converging the two-dimensional patterned beams; and
a diffractive optical element, receiving the two-dimensional patterned beams converged and emitted from the lens, and projecting speckle patterned beams corresponding to speckle patterns to an object, wherein the speckle patterns comprise a plurality of image patterns corresponding to the two-dimensional patterns, relationships between adjacent image patterns of the plurality of image patterns comprise at least two of an overlapping relationship, an adjoining relationship, and a spacing relationship, and the spacing relationship refers to that an average interval between the adjacent image patterns is greater than or equal to an average interval between speckles in the plurality of image patterns;
a capture module, used for capturing the speckle patterns projected on the object; and
a processor, receiving the captured speckle patterns and performing a depth calculation to obtain a depth image of the object.

9. The depth camera according to claim 8, wherein a size of a matching window selected in the speckle patterns is not less than a gap between the adjacent image patterns in the depth calculation.

10. The depth camera according to claim 8, wherein a baseline between the structured light projection module and the capture module is not parallel to sides of the plurality of image patterns and/or the speckle patterns.

11. The depth camera according to claim 8, wherein the at least two relationships comprise the spacing relationship.

12. A method for manufacturing a structured light projection module, comprising:
providing a substrate, wherein a material of the substrate comprises copper or ceramic;
arranging a light source on the substrate, wherein the light source comprises a plurality of sub-light sources that are arranged in a two-dimensional array and configured to emit two-dimensional patterned beams corresponding to the two-dimensional array, and the two-dimensional patterned beams comprising two-dimensional patterns;
arranging a lens on the substrate, for receiving and converging the two-dimensional patterned beams; and
arranging a diffractive optical element on the substrate, for receiving the two-dimensional patterned beams converged and emitted from the lens, and projecting speckle patterned beams corresponding to speckle patterns, wherein
the speckle patterns comprise a plurality of image patterns corresponding to the two-dimensional patterns, and relationships between adjacent image patterns of the plurality of image patterns comprise at least two of an overlapping relationship, an adjoining relationship, and a spacing relationship, and
the spacing relationship refers to that an average interval between the adjacent image patterns is greater than or equal to an average interval between speckles in the plurality of image patterns.

13. The method according to claim 12, wherein the average interval between the adjacent image patterns is one to three times the average interval between the speckles in the plurality of image patterns.

14. The method according to claim 12, wherein the light source is a vertical-cavity surface-emitting laser (VCSEL) array light source.

15. The method according to claim 12, wherein the two-dimensional patterns include irregularly distributed speckles.

16. The method according to claim 12, wherein the plurality of image patterns and the two-dimensional patterns are in a central symmetry relationship.

17. The method according to claim 12, wherein the speckle patterns are composed of the plurality of image patterns corresponding to the two-dimensional patterns, wherein the plurality of image patterns is in an irregular arrangement.

18. The method according to claim 12, wherein the at least two relationships comprise the spacing relationship.

* * * * *